(12) United States Patent
Spies (10) Patent No.: US 12,348,828 B2
(45) Date of Patent: Jul. 1, 2025

(54) SYSTEMS AND METHODS FOR DISPLAYING SEARCH RESULTS FOR PROGRAM CONTENT

(71) Applicant: DISH NETWORK L.L.C., Englewood, CO (US)

(72) Inventor: Bronson Spies, Evergreen, CO (US)

(73) Assignee: DISH Network L.L.C., Englewood, CO (US)

( * ) Notice: Subject to any disclaimer, the term of this patent is extended or adjusted under 35 U.S.C. 154(b) by 0 days.

(21) Appl. No.: 17/982,249

(22) Filed: Nov. 7, 2022

(65) Prior Publication Data
US 2024/0155201 A1    May 9, 2024

(51) Int. Cl.
*H04N 5/445* (2011.01)
*H04N 21/482* (2011.01)

(52) U.S. Cl.
CPC ..... *H04N 21/4828* (2013.01); *H04N 21/4826* (2013.01)

(58) Field of Classification Search
CPC ........................ H04N 21/4828; H04N 21/4826
See application file for complete search history.

(56) References Cited

U.S. PATENT DOCUMENTS

| | | | | |
|---|---|---|---|---|
| 6,005,565 A * | 12/1999 | Legall | ................ | H04N 21/4622 715/969 |
| 6,163,316 A * | 12/2000 | Killian | ................ | H04N 21/454 715/708 |
| 9,055,343 B1 * | 6/2015 | Lewis | ................ | H04N 21/25 |
| 2008/0189736 A1 * | 8/2008 | Edwards | ................ | H04H 60/66 348/E7.071 |
| 2012/0330854 A1 * | 12/2012 | MacLaughlin | .... | G06Q 30/0207 705/319 |
| 2014/0236735 A1 * | 8/2014 | Du | ................ | G06Q 50/01 705/14.68 |
| 2014/0245352 A1 * | 8/2014 | Tseng | ................ | G06F 3/04883 725/50 |
| 2015/0169705 A1 * | 6/2015 | Korbecki | ........... | H04N 21/4755 707/736 |
| 2019/0045250 A1 * | 2/2019 | Shapiro | ............. | H04N 21/4826 |
| 2022/0159343 A1 * | 5/2022 | Andries | ........... | H04N 21/44222 |

* cited by examiner

*Primary Examiner* — Annan Q Shang
(74) *Attorney, Agent, or Firm* — Kipman T. Werking; Frontier IP Law PLLC (57) ABSTRACT

In a system for displaying search results for program content, a first set of programs, television channels or streaming media content provider platforms are determined to be relevant to search terms based on a search. A second set of the programs, television channels or streaming media content provider platforms are also or instead listed or ordered on the display based on one or more received priority indicators received. Prior to the search, the priority indicators may pre-associate the second set of programs with one or more specific search terms used in the search. The priority indicators may give priority to order the certain programs, television channels or streaming media content provider platforms to be displayed above, or more prominently than, other items in the search listing resulting from using such search terms based on various different factors.

20 Claims, 7 Drawing Sheets

SYSTEMS AND METHODS FOR DISPLAYING SEARCH RESULTS FOR PROGRAM CONTENT

BRIEF SUMMARY

A system for displaying search results may, in response to receiving the one or more search terms for program content, cause a search to be performed in a particular program content catalog provided for programs available to be streamed or broadcast to a particular receiving device. The system may determine that a first set of programs, television channels or streaming media content provider platforms is relevant to search terms input by a user. A second set of the programs, television channels or streaming media content provider platforms are also or instead listed or ordered on the display based on one or more received priority indicators. The priority indicators may be generated and/or received based on sponsorships from various sponsor systems. For example, the priority indicators may pre-associate the second set of programs with one or more specific search terms prior to the search. Various different sponsors (e.g., advertisers) may purchase or otherwise obtain rights to one or more search terms, such that their particular sponsored programs, television channels or streaming media content provider platforms are displayed above or more prominently than other items in the search results resulting from use of those search terms by users of the receiving device, users of the content distribution system of the receiving device and/or users that meet certain characteristics or demographics. In some instances, one or both of the sets may include zero or just one item.

In one example, the system determines, based on search results from the search, that the same program relevant to the search terms is available to be streamed to the particular receiving device via a plurality of different streaming media content provider platforms. The system then electronically displays the plurality of different streaming media content provider platforms providing that same program based on the priority indicators. In particular, the streaming media content provider platforms which are sponsored are displayed above or more prominently than other streaming media content provider platforms providing the same program, but which are not sponsored, or which are sponsored at a lower level.

BRIEF DESCRIPTION OF THE DRAWINGS

The components in the drawings are not necessarily to scale relative to each other. Like reference numerals designate corresponding parts throughout the several views.

DETAILED DESCRIPTION

Figure 1:
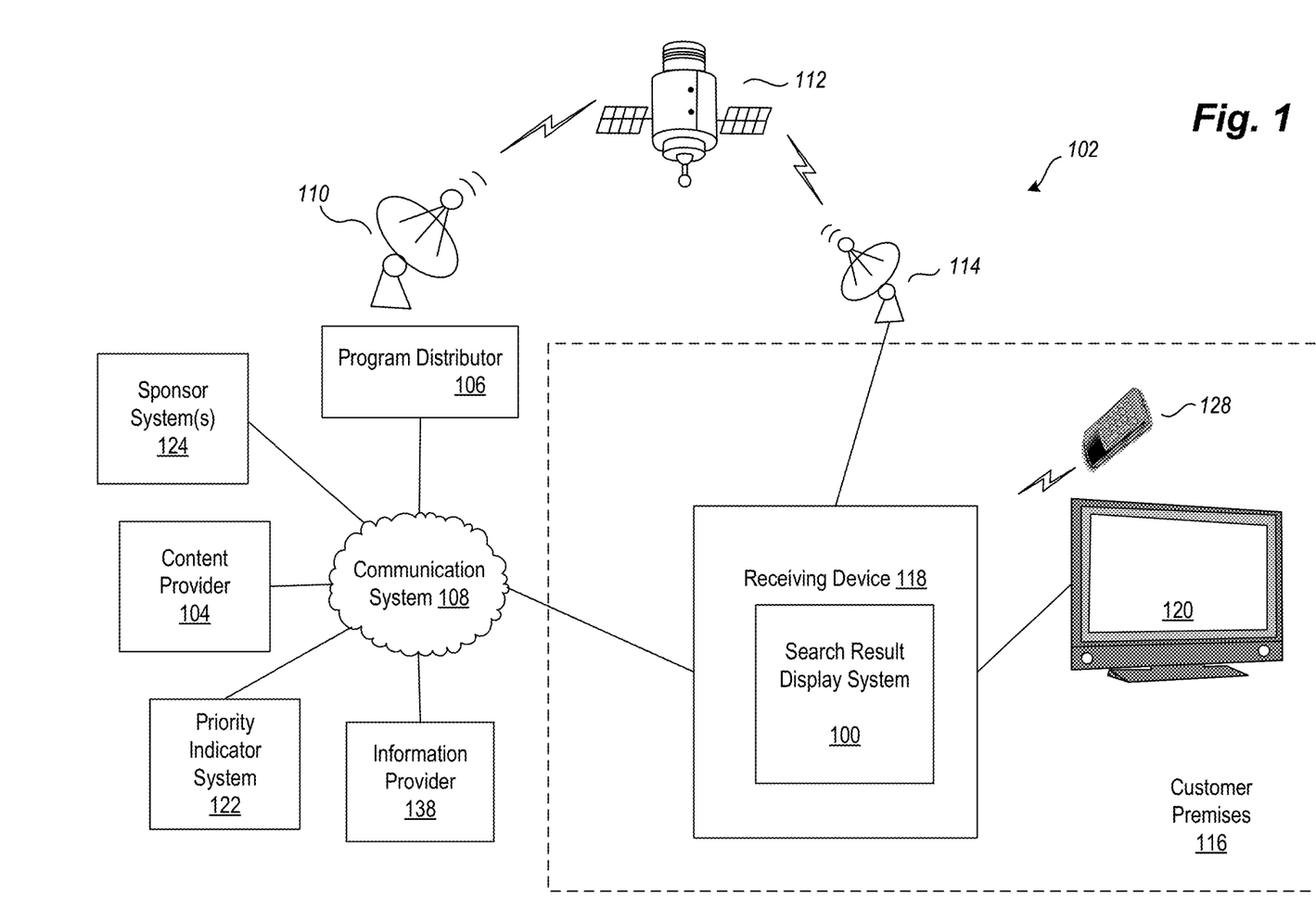
FIG. 1 is a block diagram illustrating an example environment in which embodiments of systems and methods for displaying search results for program content may be implemented according to one non-limiting embodiment.

FIG. 1 is a block diagram illustrating an example environment in which embodiments of systems and methods for displaying search results for program content may be implemented according to one non-limiting embodiment.

A search result display system 100 may be part of or otherwise operably coupled to an electronic device such as a receiving device 118 (e.g., on a customer premises 116) to search, based on received search terms, for programs available to be streamed or broadcast to receiving device 118. The search result display system 100 may also generate for display on presentation device 120 a listing of programs, television channels or streaming media content provider platforms ordered based on the search and one or more received priority indicators (e.g., based on sponsorships). For example, the search result display system 100 may cause a voice search result for "sci-fi movies" to contain a top result that is sponsored. The top result displayed based on the priority indicator may or may not have otherwise been present at all in the search results. In various embodiments, sponsored results may be offered to potential advertisers as a way to increase their content viewership on a particular television service provider's platform, such as that of a satellite television service provider providing service to receiving device 118.

Also, in various embodiments, sponsored results may be offered to potential advertisers as a path to direct consumers to specific content within the streaming services available via receiving device 118. As one example, a service provider providing service to receiving device 118 may electronically reach out to particular streaming media content providers to allow them to automatically insert sponsored results that lead to their specific streaming provider platform from a voice search or other search input methods, such as textual input, by the user. As another example, if a search reveals the same content is available via receiving device 118 on multiple platforms, the search result display system 100 may order the listed applications of the multiple platforms on which the content is available based on which of those platforms has a sponsorship tied or otherwise related to the search terms that were used to find that content. In some embodiments, the search result display system 100 may be located in, or hosted by, a remote system such as that of the program distributor 106, content provider 104 and/or information provider 138.

In one example embodiment, a first set of programs, television channels or streaming media content provider platforms may be relevant to the search terms based on the search. A second set of the programs, television channels or streaming media content provider platforms are also or instead listed or ordered on the display, such as on presentation device 120, based on one or more received priority indicators received form the priority indicator system 122. The priority indicators may be generated and/or received based on sponsorships from the various sponsor system(s) 124. For example, the priority indicators may pre-associate the second set of programs with one or more specific search terms prior to the search. Various different sponsors (e.g., advertisers) may purchase or otherwise obtain rights to one or more search terms, such that their particular sponsored programs, television channels or streaming media content provider platforms are displayed above or more prominently than other items in the search results provided in response to use of those search terms by users of the receiving device 118, users of the content distribution system of the receiving device 118 and/or users of the content distribution system that meet certain characteristics or demographics.

In various embodiments, this second set of programs may be displayed above, or more prominently on the presentation device 120 than, other items in the search result listing based on the sponsorship of the certain programs, television channels or streaming media content provider platforms in the second set. The advertisers and/or sponsors may include, but are not limited to: streaming media content providers; television broadcast channels; program distributors; other content providers; program distributors; service providers; and sponsors or other advertisers associated with particular programs, broadcast television channels or streaming media content provider platforms; etc. Sponsor system(s) 124 may include systems of such entities and/or systems of brokers, clearinghouses, agents, service providers, or representatives of such entities.

The search result display system 100 may also be operably connected to a communication system 108 to send and receive information with other systems. For example, this communication may be to receive a particular program content catalog provided by the program distributor 106, content provider 104 and/or information provider 138 for programs available to be streamed or broadcast to the particular receiving device 118; to receive priority indicators from the priority indicator system 122; to send or receive search results; to send or receive requests for search results or other such information listed above; and to send and receive configuration information regarding the receiving device 118 and/or other electronic devices in communication with the receiving device 118, etc.

Such information may also be used to generate a search results list on other devices for display on remote devices or display screens that are based on received priority indicators. In various embodiments, the program distributor 106, content provider 104, sponsor system(s) 124, and/or information provider 138 each represent multiple different entities and systems of that respective type, some or all of which communicate with one or more different receiving devices, such as receiving device 118, to implement the systems and methods for displaying search results for program content as described herein.

In the environment 102, audio, video, and/or data service providers, such as, but not limited to, television service providers, provide their customers a multitude of video and/or data programming (hereafter, collectively and/or exclusively "programming"). Such programming is often provided by use of a receiving device 118 communicatively coupled to a presentation device 120 configured to receive the programming.

The receiving device 118 interconnects to one or more communications media or sources (such as a cable head-end, satellite antenna, telephone company switch, Ethernet portal, off-air antenna, or the like) that provide the programming. The receiving device 118 commonly receives a plurality of programming by way of the communications media or sources described in greater detail below. Based upon selection by a user, the receiving device 118 processes and communicates the selected programming to the presentation device 120.

For example, the receiving device 118 may be a "television converter," "receiver," "set-top box," "television receiving device," "television receiver," "television recording device," "satellite set-top box," "satellite receiver," "cable set-top box," "cable receiver," "media player," "streaming device," and/or "television tuner." Accordingly, the receiving device 118 may be any suitable converter device or electronic equipment that is operable to receive or play back programming and communicate program content search results for presentation on presentation device 120. Further, the receiving device 118 may itself include user interface devices, such as buttons or switches. In many applications, a remote-control device ("remote") 128 is operable to control the receiving device 118 and/or the presentation device 120. The remote 128 typically communicates with the receiving device 118 using a suitable wireless medium, such as infrared ("IR"), radio frequency ("RF"), or the like. The search result display system 100 may also have such wireless functionality to communicate with and/or control other electronic devices remotely.

Examples of a presentation device 120 include, but are not limited to, a television ("TV"), a monitor, a projector, a media player, a smartphone, a tablet device, a mobile device, a personal computer ("PC"), a digital video recorder ("DVR"), game system, or the like. Presentation devices 120 employ a display, one or more speakers, and/or other output devices to communicate video and/or audio content to a user. In many implementations, one or more presentation devices 120 reside in or near a customer's premises 116 and are communicatively coupled, directly or indirectly, to the receiving device 118. Further, the receiving device 118 and the presentation device 120 may be integrated into a single device. Such a single device may have the above-described functionality of the receiving device 118 and the presentation device 120, or may even have additional functionality. Also, a search result display system such as search result display system 100 may also or instead be a part of, integrated with or otherwise operably coupled to various other electronic devices, such as presentation device 120 and/or remote 128 and, in various embodiments, may each operate independently or in conjunction with search result display system 100 of the receiving device 118. Also, a search result display system such as search result display system 100 may also or instead be a part of, integrated with or otherwise operably coupled to various other systems, such as those of program distributor 106, sponsor system(s) 124, content provider 104 and/or information provider 138.

A content provider 104 provides program content, such as television content, to a distributor, such as the program distributor 106. Example content providers include television stations which provide local or national television programming, and special content providers which provide premium based programming or pay-per-view programming. A content provider 104 may also or instead be a streaming content provider that provides streaming digital content on demand over the Internet to devices directly, or via a program distributor 106, via web browsers residing on the devices. In some embodiments, instead of via a web browser, a content provider or program distributor 106 may provide streaming digital content on demand over the Internet to devices, such as receiving device 118, via a streaming application residing on the device that is specific to, and/or receives streaming content only from, the particular content provider platform provided by the content provider 104.

Program content, which may also be referred to as a program, is communicated to the program distributor 106 from the content provider 104 through suitable communication media, generally illustrated as communication system 108 for convenience. Communication system 108 may include many different types of communication media, now known or later developed. Non-limiting media examples include telephone systems, the Internet, internets, intranets, cable systems, fiber optic systems, microwave systems, asynchronous transfer mode ("ATM") systems, frame relay systems, radio frequency ("RF") systems, cellular systems, satellite systems and other wireless systems.

In at least one embodiment, the received program content is converted by the program distributor 106 into a suitable signal (a "program signal") that is communicated (i.e., "uplinked") by one or more antennae 110 to one or more satellites 112 (separately illustrated herein from, although considered part of, the communication system 108). The communicated uplink signal may contain a plurality of multiplexed programs. The uplink signal is received by the satellite 112 and then communicated (i.e., "downlinked") from the satellite 112 in one or more directions, for example, onto a predefined portion of the planet.

A receiver antenna 114 that is within reception range of the downlink signal communicated from satellite 112 receives the above-described downlink signal. The receiver antenna 114 can be located at customer premises 116. Examples of customer premises 116 include a residence, a business, or any other suitable location operable to receive signals from satellite 112. The received signal is communicated, typically over a hard-wire connection, to the receiving device 118. The receiving device 118 converts the received signal from antenna 114 into a signal and/or format suitable for communication to a presentation device 120 or another device, such as another receiving device, a mobile device or a home computing system. In some embodiments, the receiver antenna 114 may be remotely located from the customer premises 116. For example, the antenna 114 may be located on the roof of an apartment building, such that the received signals may be transmitted, after possible recoding, via cable or other mechanisms, such as Wi-Fi, to the customer premises 116.

The receiving device 118 may receive programming partially, or entirely, from a source other than the above-described receiver antenna 114. Other embodiments of the receiving device 118 may receive programming from program distributors 106 and/or content providers 104 via locally broadcast RF signals, cable, fiber optic, Internet media, or the like.

In addition, information provider 138 may provide various forms of content and/or services to various devices residing in the customer premises 116. For example, information provider 138 may provide a program content catalog provided of programs (or metadata regarding or identifying programs) available to be streamed or broadcast to the particular receiving device, an EPG, a Web page or other information to the receiving device 118 or other computing device. Information provider 138 may further perform or facilitate electronic commerce transactions. Information provider 138 may also provide information regarding characteristics or demographics of users of receiving device 118, search term sponsorship pricing, etc. The information provider 138 may also communicate with and/or provide such information to any other entity or system shown in FIG. 1.

The above description of the environment 102, the customer premises 116, and the various devices therein, is intended as a broad, non-limiting overview of an example environment in which various embodiments of systems and methods for displaying search results for program content may be implemented. FIG. 1 illustrates just one example of a content distribution environment 102 and the various embodiments discussed herein are not limited to such environments. In particular, environment 102 and the various devices therein, may contain other devices, systems and/or media not specifically described herein. For example, in some embodiments, the search result display system 100 may be embedded or otherwise located in a component of a mobile device, smartphone or vehicle and the presentation device 120 may be that of a mobile device, vehicle navigation system or other audio-visual system.

Example embodiments described herein provide applications, tools, data structures and other support to implement systems and methods for displaying search results for program content. The example of the electronic device having a search result display system 100 shown in FIG. 1 is receiving device 118. However, other embodiments of the described techniques may include other devices having a search result display system such that sponsored search results associated with other devices and/or users may be generated, including other receiving devices, such as audio and DVD players, digital recorders, computers, peripherals, output devices, televisions, mobile devices, smartphones, tablets and other electronic devices. In the following description, numerous specific details are set forth, such as data formats, code sequences, and the like, in order to provide a thorough understanding of the described techniques. The embodiments described also can be practiced without some of the specific details described herein, or with other specific details, such as changes with respect to the ordering of the code flow, different code flows, and the like. Thus, the scope of the techniques and/or functions described are not limited by the particular order, selection, or decomposition of steps described with reference to any particular module, component, or routine.

Figure 2:
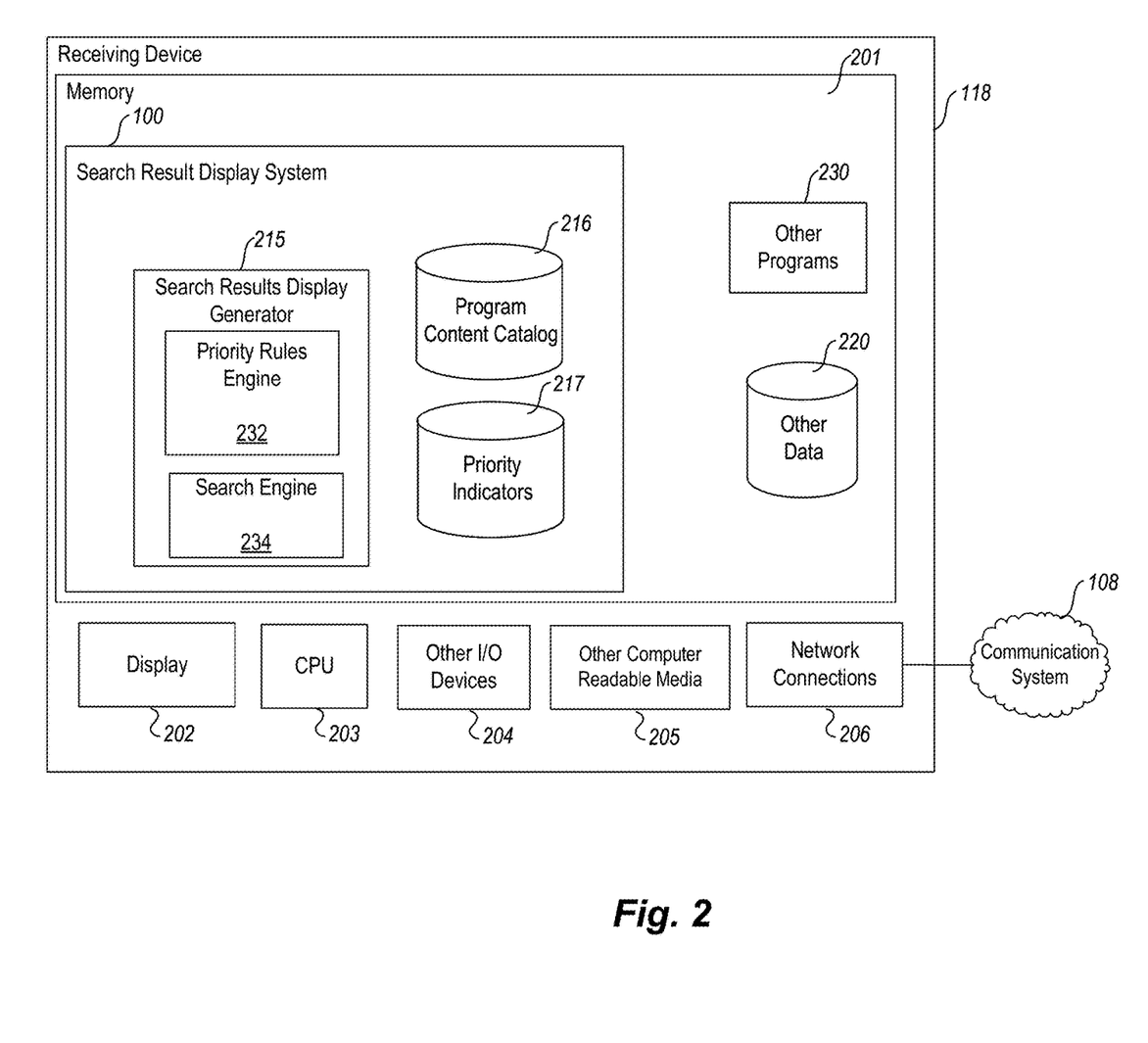
FIG. 2 is a block diagram illustrating elements of an example receiving device having a system for displaying search results for program content according to one non-limiting embodiment.

FIG. 2 is a block diagram illustrating elements of an example receiving device having a system for displaying search results for program content according to one non-limiting embodiment.

In one embodiment, the receiving device 118 is a set-top box configured to receive, record and display programming on a presentation device, such as presentation device 120 shown in FIG. 1. In other embodiments, the receiving device 118 is part of a presentation device, such as a television, or is a digital video recorder (DVR) device, or part of a mobile device or other portable computing device. Note that one or more general purpose or special purpose computing systems/devices may be used to operate and store information regarding the receiving device 118, and communicate with communication system 108. In addition, the receiving device 118 may comprise one or more distinct computing systems/devices and may span distributed locations. Furthermore, each block shown may represent one or more such blocks as appropriate to a specific embodiment or may be combined with other blocks. Also, the search result display system 100 of the receiving device 118 may be implemented in software, hardware, firmware, or in some combination to achieve the capabilities described herein.

In the embodiment shown, receiving device 118 comprises a computer memory ("memory") 201, a display 202, one or more Central Processing Units ("CPU") 203, Input/Output devices 204 (e.g., keyboard, mouse, RF or infrared receiver, light emitting diode (LED) panel or liquid crystal display (LCD), USB ports, other communication ports, and the like), other computer-readable media 205, and network connections 206. The program content catalog 216, the priority indicators 217 and search results display generator 215 portions of the search result display system 100 are shown residing in memory 201. In other embodiments, some portion of the contents, and some, or all, of the components of program content catalog 216, priority indicators 217 and search results display generator 215 may be stored on and/or transmitted over the other computer-readable media 205. The search results display generator 215 preferably executes on one or more CPUs 203 and facilitates the displaying search results for program content as described herein. The search result display system 100 also facilitates communication with peripheral devices, such as remote 128 and remote systems, such as the program distributor 106, content provider 104, sponsor system(s) 124, priority indicator system 122 and/or information provider 138, via the I/O devices 204 and network connections 206. For example, the search result display system 100 may also interact via the communication system 108 with other devices and systems such as the program distributor 106, content provider 104, sponsor system(s) 124, priority indicator system 122 and/or information provider 138, or the like. For example, the other device may be a home computing system (e.g., a desktop computer, a laptop computer, etc.) or mobile device that includes the functionality of the search results display generator 215 components of the search result display system 100.

The priority rules engine 232 may electronically receive, via an input device for the receiving device 118 (e.g., the remote control 128), one or more search terms for program content available to be streamed or broadcast to the receiving device 118. In response to receiving the one or more search terms for program content, the priority rules engine 232 may electronically cause the search engine 234 to search, in the program content catalog 216, for program content relevant to the one or more search terms. The program content catalog 216 may have been provided via communication system 108 (e.g., by the program distributor 106, content provider 104 and/or information provider 138) to indicate programs available to be streamed or broadcast to the receiving device 118.

In response to the search, priority rules engine 232 may cause a listing of programs, television channels or streaming media content provider platforms to be displayed on the screen of the presentation device 120. A first set of the listed programs, television channels or streaming media content provider platforms are relevant to the search terms based on the search and a second set of the listed programs, television channels or streaming media content provider platforms are also or instead listed or ordered on the display based on one or more received priority indicators 217 pre-associating the second set with the one or more search terms prior to the search.

For example, the priority rules engine 232 may electronically generate or receive one or more priority indicators 217 for certain programs, television channels or streaming media content provider platforms based on and in response to a sponsorship of the certain programs, television channels or streaming media content provider platforms. The priority indicators 217 give priority to order the certain programs, television channels or streaming media content provider platforms, in response to the search, to be displayed on the screen of the presentation device 120 above, or more prominently than, other items in the search result listing based on the sponsorship of the certain programs, television channels or streaming media content provider platforms.

In one example, the priority rules engine 232 electronically determines, based on search results from the search, that a same program relevant to the search terms is available to be streamed to the particular receiving device via a plurality of different streaming media content provider platforms. The search results display generator 215 then electronically displays on the screen of the presentation device 120 the plurality of different streaming media content provider platforms based on the priority indicators 217. The streaming media content provider platforms which are sponsored are displayed above or more prominently than other streaming media content provider platforms providing the same program, but which are not sponsored, or which are sponsored at a lower level.

Other code or programs 230 (e.g., an audio/video processing module, a Web server, and the like), and potentially other data repositories, such as other data store 220, also reside in the memory 201, and preferably execute on one or more CPUs 203. Of note, one or more of the components in FIG. 2 may not be present in any specific implementation. For example, some embodiments may not provide other computer readable media 205 or a display 202.

In some embodiments, the search result display system 100 includes an application program interface ("API") that provides programmatic access to one or more functions of the search result display system 100. Such an API may provide a programmatic interface to one or more functions of the search result display system 100 that may be invoked by one of the other programs 230 or some other module. In this manner, the API enables software, such as user interfaces, plug-ins and adapters to integrate functions of the search result display system 100 into desktop computer or mobile device applications, and the like.

In addition, the API may be, in at least some embodiments, invoked or otherwise accessed via the search result display system 100, or remote entities, such as the program distributor 106, content provider 104, sponsor system(s) 124, priority indicator system 122 and/or information provider 138 to access various functions of the search result display system 100. For example, the sponsor system(s) 124 may select particular search terms to purchase for the purpose of sponsoring a particular television program provided on a particular channel or streaming platform, and communicate this to the search result display system 100, program distributor 106, content provider 104, priority indicator system 122 and/or information provider 138 via one or more APIs interfacing with those systems. In various embodiments, the priority indicator system 122 receives such information and sends applicable priority indicators 217 to the search result display system 100 to indicate which programs, television channels or streaming media content provider platforms are to be displayed more prominently in conjunction with or as part of search results in response to particular search terms being used.

In various embodiments, one or more of the search results display system 100, program content catalog 216 and priority indicators 217 may be operably present in one or more of the program distributor 106, content provider 104, sponsor system(s) 124, priority indicator system 122 and/or information provider 138. For example, the receiving device 118 may transmit the search terms to a remote system and then the search may be performed remotely from the receiving device 118. The search results including any sponsored results may then be communicated back to the receiving device 118 via network 108 for display on the screen of the presentation device 120.

In an example embodiment, components/modules of the search result display system 100 are implemented using standard programming techniques. For example, the operation rules stored in the search results display generator 215, priority rules engine 232 and search engine 234 portions of the search result display system 100 may be implemented as a "native" executable running on the CPU 203, along with one or more static or dynamic libraries. In other embodiments, the, the operation rules stored in the search results display generator 215, priority rules engine 232 and search engine 234 portions of the search result display system 100 may be implemented as instructions processed by a virtual machine that executes as one of the other programs 230. In general, a range of programming languages known in the art may be employed for implementing such example embodiments, including representative implementations of various programming language paradigms, including but not limited to, object-oriented (e.g., Java, C++, C #, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), or declarative (e.g., SQL, Prolog, XML, and the like).

In a software or firmware implementation, instructions stored in a memory configure, when executed, one or more processors of the receiving device 118 to perform the functions of the search result display system 100 described herein. In one embodiment, instructions cause the CPU 203 or some other processor, such as an I/O controller/processor, to perform displaying search results for program content as described herein. Similarly, the CPU 203 or other processor may be configured to perform other operations such as playing a recording of content and tracking viewing habits and interaction with sponsored results.

The embodiments described above may also use well-known or other synchronous or asynchronous client-server computing techniques. However, the various components may be implemented using more monolithic programming techniques as well; for example, as an executable running on a single CPU computer system, or alternatively decomposed using a variety of structuring techniques known in the art, including but not limited to, multiprogramming, multi-threading, client-server, or peer-to-peer, running on one or more computer systems each having one or more CPUs. Some embodiments may execute concurrently and asynchronously, and communicate using message passing techniques. Equivalent synchronous embodiments are also supported by a receiving device search result display system 100 implementation. Also, other functions could be implemented and/or performed by each component/module, and in different orders, and by different components/modules, yet still achieve the functions of the search result display system 100.

In addition, programming interfaces to the data stored as part of the search result display system 100, can be available by standard mechanisms such as through C, C++, C #, and Java APIs; libraries for accessing files, databases, or other data repositories; scripting languages such as XML; or Web servers, FTP servers, or other types of servers providing access to stored data. The operations rules 216 and other data store 220 may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, and Web Services (XML-RPC, JAX-RPC, SOAP, and the like). Other variations are possible. Other functionality could also be provided by each component/module, or existing functionality could be distributed amongst the components/modules in different ways, yet still achieve the functions of the search result display system 100.

Furthermore, in some embodiments, some or all of the components of the search result display system 100 may be implemented or provided in other manners, such as at least partially in firmware and/or hardware, including, but not limited to one or more application-specific integrated circuits ("ASICs"), standard integrated circuits, controllers (e.g., by executing appropriate instructions and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network, cellular wireless network or other data transmission medium; or a non-transitory computer-readable storage medium to be read by an appropriate drive or via an appropriate connection, such as a DVD, random access memory (RAM) or flash memory device) so as to enable or configure the computer-readable medium and/or one or more associated computing systems or devices to execute or otherwise use or provide the contents to perform at least some of the described techniques. A transitory computer-readable medium as used herein means a signal transmission itself (for example, a propagating electrical or electromagnetic signal itself) and not the hardware medium on which information is stored. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

Figure 3:
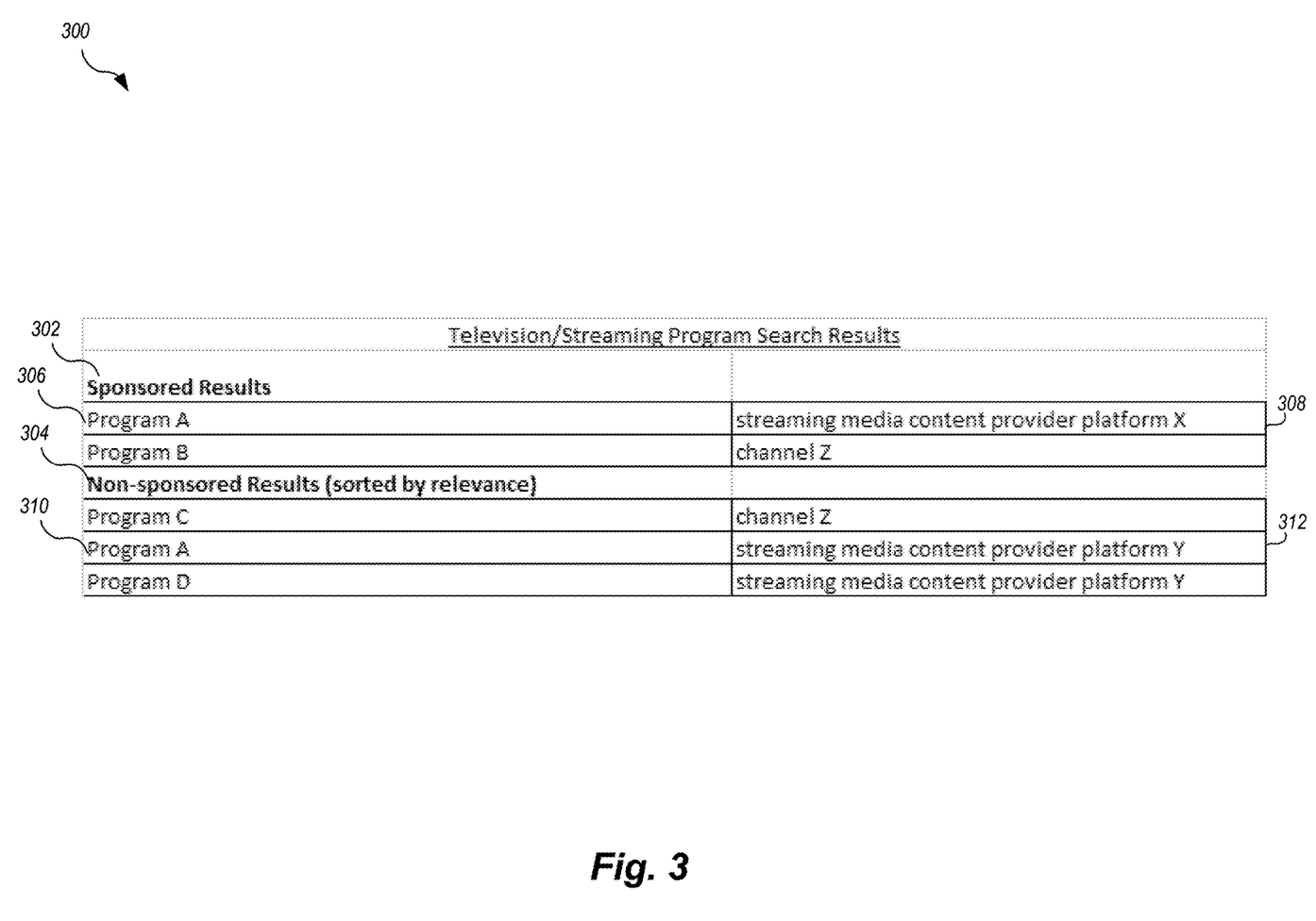
FIG. 3 is an example search results according to one non-limiting embodiment.

FIG. 3 is an example search results 300 according to one non-limiting embodiment. In the example shown, a user has entered search terms (e.g., via a voice enabled remote control 128 or by textual input) to find particular programming related to those search terms. In response, the system 100 of FIG. 2 has displayed on the screen of the presentation device 120 of FIG. 1 search results 300 including a sponsored results section 302 as top search results above or on top of the non-sponsored results section 304. In the present example, as a result of the search, the system 100 found that Program A 306 relevant to the search terms is available on streaming media content provider platform X 308 and the same Program A 310 is also available on the streaming media content provider platform Y 312. However, streaming media content provider platform X has sponsored the search terms such that programs available from content provider platform X related to such search terms are displayed above other non-sponsored results. Thus, in the search results 300, Program A 306 available on streaming media content provider platform X is displayed as a selectable item in the sponsored results section 302, whereas Program A 310 available on the streaming media content provider platform Y is displayed as a selectable item in the non-sponsored results section 304 below the sponsored results section 302. When the user selects the listing Program A 306 available on streaming media content provider platform X 308, a process may be initiated to play Program A via streaming media content provider platform X 308 or provide further information regarding Program A on streaming media content provider platform X 308. The user may instead select the listing Program A 310 available on streaming media content provider platform Y 312, and a process may be initiated to play Program A instead via streaming media content provider platform Y 312 or provide further information regarding Program A on streaming media content provider platform Y 312.

Figure 4:
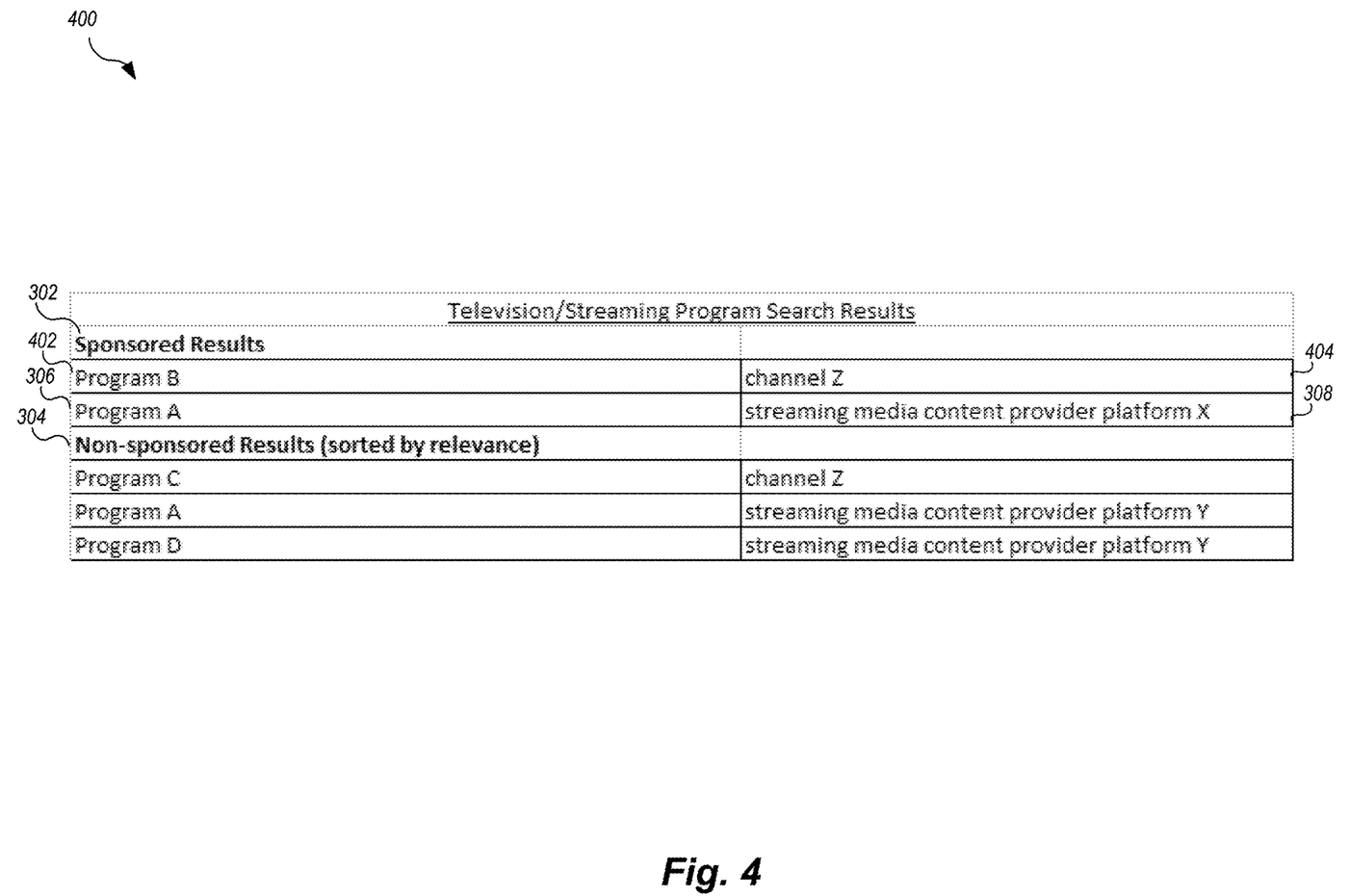
FIG. 4 is an example search results according to another non-limiting embodiment.

FIG. 4 is an example search results 400 according to another non-limiting embodiment. In the example shown, a user has entered search terms (e.g., via a voice enabled remote control 128 or by textual input) to find particular programming related to those search terms. In response, the system 100 of FIG. 2 has displayed on the screen of the presentation device 120 of FIG. 1 search results 400 including a sponsored results section 302 as top search results above or on top of the non-sponsored results section 304. In the present example, as a result of the search, the system 100 has found that there exists a priority indicator based on a sponsorship of those search terms for Program B 402 on channel z 404 and a priority indicator based on a sponsorship of those search terms for Program A 306 on streaming media content provider platform X 308. However, there may be additional priority indicators indicating which search result listing takes priority within such sponsored results (i.e., within the sponsored results section 302). In the present example, the priority indicators (e.g., from priority indicators 217) indicate that Program B 402 on channel z 404 is to be listed within the sponsored results section 302 above Program A 306 on streaming media content provider platform X 308 (e.g., sue to a higher sponsorship level) based on use of those search terms or other criteria, regardless of a degree of relevance of the individual program to the search terms. For example, a highest sponsorship level may cause a priority indicator to indicate that all programs on a particular channel or streaming media content provider platform are always to be listed at the very top of the sponsored results section 302.

Figure 5:
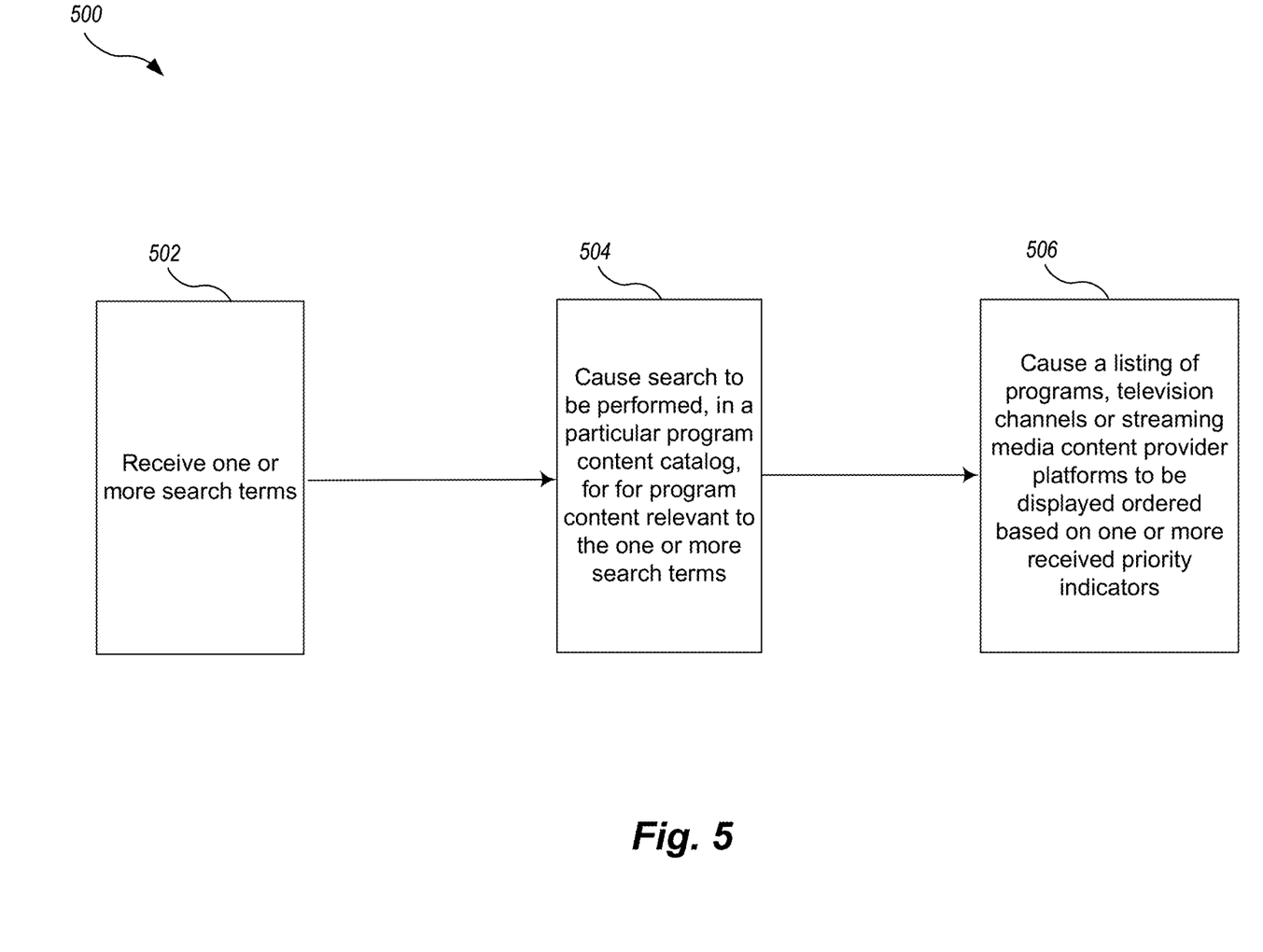
FIG. 5 is a flow diagram of an example method for displaying search results for program content according to one non-limiting embodiment.

FIG. 5 is a flow diagram of an example method 500 for displaying search results for program content according to one non-limiting embodiment.

At 502, the system 100 electronically receives, via an input device for a receiving device, one or more search terms for program content available to be streamed or broadcast to the particular receiving device. In an example embodiment, the input device is a remote control device, and the electronically receiving the one or more search terms for program content available to be streamed or broadcast to the particular receiving device includes receiving the one or more search terms as voice input via the remote control device. However, other embodiments the input device is a keyboard, touch screen or other device capable of receiving and processing the search terms as textual input.

At 504, the system 100, in response to receiving the one or more search terms for program content, electronically causes a search to be performed, in a particular program content catalog provided for programs available to be streamed or broadcast to the particular receiving device, for program content relevant to the one or more search terms.

At 506, the system 100, in response to the search, electronically causing a listing of programs, television channels or streaming media content provider platforms to be displayed on the screen. A first set of the listed programs, television channels or streaming media content provider platforms are relevant to the search terms based on the search. A second set of the listed programs, television channels or streaming media content provider platforms are also or instead listed or ordered on the display based on one or more received priority indicators pre-associating the second set with the one or more search terms prior to the search. For example, referring to FIG. 2, the priority rules engine 232 may electronically generate or receive one or more priority indicators 217 for certain programs, television channels or streaming media content provider platforms based on and in response to a sponsorship of the certain programs, television channels or streaming media content provider platforms. The priority indicators 217 give priority to order the certain programs, television channels or streaming media content provider platforms, in response to the search, to be displayed on the screen of the presentation device 120 above, or more prominently than, other items in the search result listing based on the sponsorship of the certain programs, television channels or streaming media content provider platforms.

In another example, the priority rules engine 232 electronically determines, based on search results from the search, that a same program relevant to the search terms is available to be streamed to the particular receiving device via a plurality of different streaming media content provider platforms. The search results display generator 215 then electronically displays on the screen of the presentation device 120 the plurality of different streaming media content provider platforms based on the priority indicators 217. The streaming media content provider platforms which are sponsored are displayed above or more prominently than other streaming media content provider platforms providing the same program, but which are not sponsored, or which are sponsored at a lower level.

Figure 6:
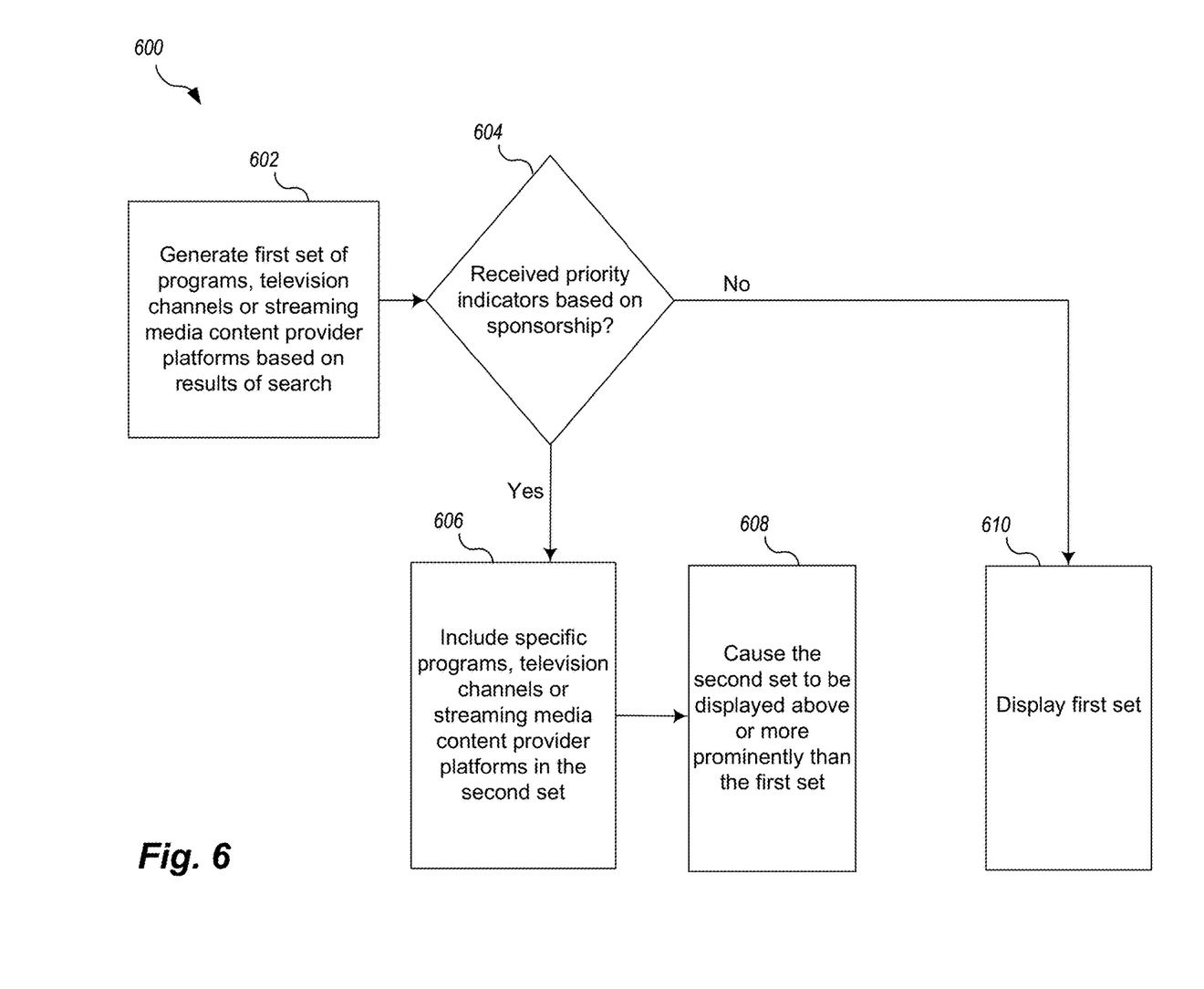
FIG. 6 is a flow diagram of an example method for displaying search results for program content involving received priority indicators based on sponsorship according to one non-limiting embodiment.

FIG. 6 is a flow diagram of an example method 600 for displaying search results for program content involving received priority indicators based on sponsorship according to one non-limiting embodiment. In an example embodiment, causing the listing of programs, television channels or streaming media content provider platforms to be displayed on the screen as described with respect to method 500 may include the operation of method 600.

At 602, the system 100 electronically generates the first set of programs, television channels or streaming media content provider platforms based on results of the search.

At 604, the system 100 determines whether there are any received priority indicators pre-associating the one or more search terms with any specific programs, television channels or streaming media content provider platforms available to be streamed or broadcast to the particular receiving device based on a sponsorship associated with the specific programs, television channels or streaming media content provider platforms. If it is determined that there are received priority indicators pre-associating the one or more search terms with any specific programs, television channels or streaming media content provider platforms available to be streamed or broadcast to the particular receiving device based on a sponsorship associated with the specific programs, television channels or streaming media content provider platforms, then the method 600 proceeds to 606. On the other hand, if it is determined that there are not any received priority indicators pre-associating the one or more search terms with any specific programs, television channels or streaming media content provider platforms available to be streamed or broadcast to the particular receiving device based on a sponsorship associated with the specific programs, television channels or streaming media content provider platforms, then the method 600 proceeds to 610.

At 606, the system 100 electronically includes the one or more specific programs, television channels or streaming media content provider platforms in the second set.

At 608, the system 100 electronically causes the specific programs, television channels or streaming media content provider platforms included in the second set to be displayed above or more prominently than all programs, television channels and streaming media content provider platforms in the first set.

At 610, if it is determined that there are not any received priority indicators pre-associating the one or more search terms with any specific programs, television channels or streaming media content provider platforms available to be streamed or broadcast to the particular receiving device based on a sponsorship associated with the specific programs, television channels or streaming media content provider platforms, then the system 100 just displays the first set.

Figure 7:
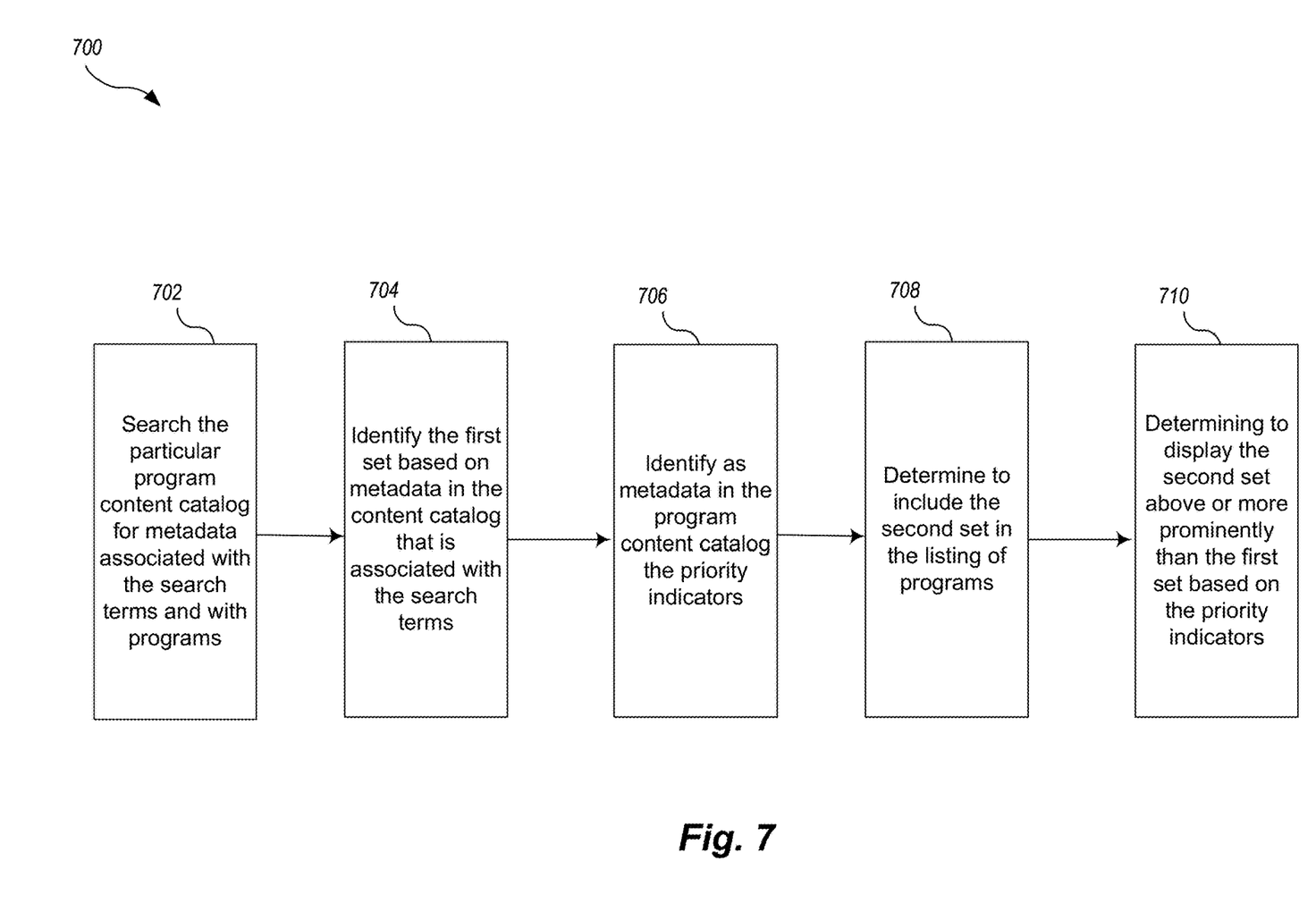
FIG. 7 is a flow diagram of an example method for displaying search results for program content involving searching metadata in a program content catalog according to one non-limiting embodiment.

FIG. 7 is a flow diagram of an example method 700 for displaying search results for program content involving searching metadata in a program content catalog according to one non-limiting embodiment. In an example embodiment, causing the search to be performed as described with respect to method 500 may include the operation of method 700.

At 702, the system 100, in response to receiving the search terms, searches the particular program content catalog for metadata associated with the search terms and with programs which, according to the catalog, are available to be streamed or broadcast to the particular receiving device.

At 704, the system 100, as a result of the searching, identifies the first set based on metadata that is associated with the search terms and also describes content characteristics of the first set.

At 706, the system 100, as a result of the searching, identifies as metadata in the particular program content catalog the priority indicators pre-associating the second set with the one or more search terms. The priority indicators indicate to display for selection the second set above or more prominently on the display than the first set.

At 708, the system 100, determines to include the second set in the listing of programs based on the result of the searching in the particular program content catalog.

At 710, the system 100 determines to display the second set for selection in the listing of programs above or more prominently on the display than the first set based on the priority indicators.

While various embodiments have been described hereinabove, it is to be appreciated that various changes in form and detail may be made without departing from the scope of the invention(s) presently or hereafter claimed.

The invention claimed is:

1. A system for displaying search results for program content, the system comprising:
at least one processor; and
at least one memory coupled to the at least one processor, wherein the at least one memory has computer-executable instructions stored thereon that, when executed by the at least one processor, cause operations to be performed, the operations including:
electronically receiving, via an input device for a particular receiving device, one or more search terms for program content available to be streamed or broadcast to the particular receiving device;
in response to receiving the one or more search terms for program content, electronically causing a search to be performed, in a particular program content catalog provided for programs available to be streamed or broadcast to the particular receiving device, for program content relevant to the one or more search terms; and
in response to the search, electronically causing a listing of programs, television channels or streaming media content provider platforms to be displayed on a display, wherein a first set of the listing of programs, television channels or streaming media content provider platforms are relevant to the one or more search terms based on the search and a second set of the listing of programs, television channels or streaming media content provider platforms are also or instead listed or ordered on the display based on one or more received priority indicators pre-associating the second set with the one or more search terms prior to the search;
wherein:
a first instance of a program on a first platform is prioritized in the second set of the listing of programs over a second instance of the same program on a second and distinct platform in the first set of the listing of programs due to the first platform sponsoring the one or more search terms rather than the second platform.

2. The system of claim 1 wherein the operations further comprise:
electronically generating or receiving the one or more received priority indicators for certain programs, television channels or streaming media content provider platforms based on and in response to a sponsorship of the certain programs, television channels or streaming media content provider platforms, wherein the one or more received priority indicators give priority to order the certain programs, television channels or streaming media content provider platforms to be displayed above, or more prominently than, other items in the listing based on the sponsorship of the certain programs, television channels or streaming media content provider platforms.

3. The system of claim 1 wherein the causing the listing of programs, television channels or streaming media content provider platforms to be displayed on the display includes:
electronically determining, based on search results from the search, that a same program relevant to the one or more search terms is available to be streamed to the particular receiving device via a plurality of different streaming media content provider platforms; and
electronically displaying on the display the plurality of different streaming media content provider platforms based on the one or more received priority indicators such that one or more streaming media content provider platforms in the plurality which are sponsored are displayed above or more prominently than other streaming media content provider platforms in the plurality which are not sponsored, or which are sponsored at a lower level.

4. The system of claim 1 wherein the causing the listing of programs, television channels or streaming media content provider platforms to be displayed on the display includes:
  electronically generating the first set of the listing of programs, television channels or streaming media content provider platforms based on results of the search;
  electronically determining whether there are any received priority indicators pre-associating the one or more search terms with any specific programs, television channels or streaming media content provider platforms available to be streamed or broadcast to the particular receiving device based on a sponsorship associated with the specific programs, television channels or streaming media content provider platforms;
  in response to a determination that there are received priority indicators pre-associating the one or more search terms with one or more specific programs, television channels or streaming media content provider platforms, electronically including the one or more specific programs, television channels or streaming media content provider platforms in the second set; and
  electronically causing the specific programs, television channels or streaming media content provider platforms included in the second set to be displayed above or more prominently than all programs, television channels and streaming media content provider platforms in the first set.

5. The system of claim 1 wherein the causing a search to be performed includes:
  in response to receiving the one or more search terms, searching the particular program content catalog for metadata associated with the one or more search terms and with programs which, according to the particular program content catalog, are available to be streamed or broadcast to the particular receiving device;
  as a result of the searching, identifying the first set based on metadata that is associated with the one or more search terms and also describes content characteristics of the first set;
  as a result of the searching, identifying as metadata in the particular program content catalog the one or more received priority indicators pre-associating the second set with the one or more search terms, wherein the one or more received priority indicators indicate to display for selection the second set above or more prominently on the display than the first set;
  determining to include the second set in the listing of programs based on the result of the searching in the particular program content catalog; and
  determining to display the second set for selection in the listing of programs above or more prominently on the display than the first set based on the one or more received priority indicators.

6. The system of claim 1 wherein the second set includes programs.

7. The system of claim 1 wherein the second set includes television channels.

8. The system of claim 1 wherein the second set includes streaming media content provider platforms.

9. The system of claim 1 wherein the input device is a remote control device, and the electronically receiving the one or more search terms for program content available to be streamed or broadcast to the particular receiving device includes receiving the one or more search terms as voice input via the remote control device.

10. A method for displaying search results for program content, the method comprising:
  electronically receiving, via an input device for a particular receiving device, one or more search terms for program content available to be streamed or broadcast to the particular receiving device;
  in response to receiving the one or more search terms for program content, electronically causing a search to be performed, in a particular program content catalog provided for programs available to be streamed or broadcast to the particular receiving device, for program content relevant to the one or more search terms; and
  in response to the search, electronically causing a listing of programs, television channels or streaming media content provider platforms to be displayed on a display, wherein a first set of the listing of programs, television channels or streaming media content provider platforms are relevant to the one or more search terms based on the search and a second set of the listing of programs, television channels or streaming media content provider platforms are also or instead listed or ordered on the display based on one or more received priority indicators pre-associating the second set with the one or more search terms prior to the search;
  wherein:
  a first instance of a program on a first platform is prioritized in the second set of the listing of programs over a second instance of the same program on a second and distinct platform in the first set of the listing of programs due to the first platform sponsoring the one or more search terms rather than the second platform.

11. The method of claim 10, further comprising:
  electronically generating or receiving the one or more received priority indicators for certain programs, television channels or streaming media content provider platforms based on and in response to a sponsorship of the certain programs, television channels or streaming media content provider platforms, wherein the one or more received priority indicators give priority to order the certain programs, television channels or streaming media content provider platforms to be displayed above, or more prominently than, other items in the listing based on the sponsorship of the certain programs, television channels or streaming media content provider platforms.

12. The method of claim 10 wherein the causing the listing of programs, television channels or streaming media content provider platforms to be displayed on the display includes:
  electronically determining, based on search results from the search, that a same program relevant to the one or more search terms is available to be streamed to the particular receiving device via a plurality of different streaming media content provider platforms; and
  electronically displaying on the display the plurality of different streaming media content provider platforms based on the one or more received priority indicators such that one or more streaming media content provider platforms in the plurality which are sponsored are displayed above or more prominently than other streaming media content provider platforms in the plurality which are not sponsored, or which are sponsored at a lower level.

13. The method of claim 10 wherein the causing the listing of programs, television channels or streaming media content provider platforms to be displayed on the display includes:
    electronically generating the first set of the listing of programs, television channels or streaming media content provider platforms based on results of the search;
    electronically determining whether there are any received priority indicators pre-associating the one or more search terms with any specific programs, television channels or streaming media content provider platforms available to be streamed or broadcast to the particular receiving device based on a sponsorship associated with the specific programs, television channels or streaming media content provider platforms;
    in response to a determination that there are received priority indicators pre-associating the one or more search terms with one or more specific programs, television channels or streaming media content provider platforms, electronically including the one or more specific programs, television channels or streaming media content provider platforms in the second set; and
    electronically causing the specific programs, television channels or streaming media content provider platforms included in the second set to be displayed above or more prominently than all programs, television channels and streaming media content provider platforms in the first set.

14. The method of claim 10 wherein the causing a search to be performed includes:
    in response to receiving the one or more search terms, searching the particular program content catalog for metadata associated with the one or more search terms and with programs which, according to the particular program content catalog, are available to be streamed or broadcast to the particular receiving device;
    as a result of the searching, identifying the first set based on metadata that is associated with the one or more search terms and also describes content characteristics of the first set;
    as a result of the searching, identifying as metadata in the particular program content catalog the one or more received priority indicators pre-associating the second set with the one or more search terms, wherein the one or more received priority indicators indicate to display for selection the second set above or more prominently on the display than the first set;
    determining to include the second set in the listing of programs based on the result of the searching in the particular program content catalog; and
    determining to display the second set for selection in the listing of programs above or more prominently on the display than the first set based on the one or more received priority indicators.

15. The method of claim 10 wherein the second set includes programs.

16. The method of claim 10 wherein the second set includes television channels.

17. The method of claim 10 wherein the second set includes streaming media content provider platforms.

18. A non-transitory computer-readable storage medium having computer executable instructions thereon, that when executed by at least one computer processor, cause operations to be performed, the operations including:
    electronically receiving, via an input device for a particular receiving device, one or more search terms for program content available to be streamed or broadcast to the particular receiving device;
    in response to receiving the one or more search terms for program content, electronically causing a search to be performed, in a particular program content catalog provided for programs available to be streamed or broadcast to the particular receiving device, for program content relevant to the one or more search terms; and
    in response to the search, electronically causing a listing of programs, television channels or streaming media content provider platforms to be displayed on a display, wherein a first set of the listing of programs, television channels or streaming media content provider platforms are relevant to the one or more search terms based on the search and a second set of the listing of programs, television channels or streaming media content provider platforms are also or instead listed or ordered on the display based on one or more received priority indicators pre-associating the second set with the one or more search terms prior to the search;
wherein:
    a first instance of a program on a first platform is prioritized in the second set of the listing of programs over a second instance of the same program on a second and distinct platform in the first set of the listing of programs due to the first platform sponsoring the one or more search terms rather than the second platform.

19. The non-transitory computer-readable storage medium of claim 18 wherein the operations further include:
    electronically generating or receiving the one or more received priority indicators for certain programs, television channels or streaming media content provider platforms based on and in response to a sponsorship of the certain programs, television channels or streaming media content provider platforms, wherein the one or more received priority indicators give priority to order the certain programs, television channels or streaming media content provider platforms to be displayed above, or more prominently than, other items in the listing based on the sponsorship of the certain programs, television channels or streaming media content provider platforms.

20. The non-transitory computer-readable storage medium of claim 18 wherein the causing the listing of programs, television channels or streaming media content provider platforms to be displayed on the display includes:
    electronically determining, based on search results from the search, that a same program relevant to the one or more search terms is available to be streamed to the particular receiving device via a plurality of different streaming media content provider platforms; and
    electronically displaying on the display the plurality of different streaming media content provider platforms based on the one or more received priority indicators such that one or more streaming media content provider platforms in the plurality which are sponsored are displayed above or more prominently than other streaming media content provider platforms in the plurality which are not sponsored, or which are sponsored at a lower level.

\* \* \* \* \*